United States Patent Office 3,555,090
Patented Jan. 12, 1971

---

3,555,090
PROCESS FOR SELECTIVE DEHALOGENATION OF 2,2-DIHALOALKYL-ALKANOYLACETAMIDES
David L. Pearson, Aurora, Colo., and Jon B. Reid, Whitehall, Mich., assignors to Shell Oil Company, New York, N.Y., a corporation of Delaware
No Drawing. Filed Sept. 8, 1967, Ser. No. 666,501
Int. Cl. C07c 103/12
U.S. Cl. 260—561    9 Claims

---

ABSTRACT OF THE DISCLOSURE

A process for selective dehalogenation of 2,2-dihaloalkylalkanoylacetamides to 2 - haloalkylalkanoylacetamide which comprises reacting a 2,2-dihaloalkylalkanoylacetamide of the formula

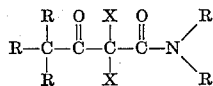

wherein R is hydrogen or alkyl and X is chlorine or bromine, with a molar equivalent of one or more of certain multi-valent transition metals, in an aqueous acidic solvent.

---

Introduction

Dialkyl 2-carbamoylvinyl phosphates are known as an important class of insecticides. As set forth in U.S. Patent 2,802,855, such phosphates are prepared by reacting the appropriate trialkyl phosphate with the appropriate 2-haloalkylalkanoylacetamide.

However, 2-haloalkylalkanoylacetamides are quite difficult to prepare commercially without producing substantial amounts of 2,2-dihaloalkylalkanoylacetamides. These compounds also react with trialkyl phosphites to form dialkyl-2-halo-2-carbamoylvinyl phosphates. The presence of the latter type of compound in the above-mentioned insecticide is highly undesirable. This is due to its unwanted qualities of less insecticidal activity and greater mammalian toxicity as compared to the desired non-halogenated phosphate insecticide.

The 2-haloalkylalkanoylacetamides have customarily been prepared commercially by halogenation of the corresponding alkylalkanoylacetamides. As mentioned above, it has been found very difficult to avoid formation of the corresponding 2,2-dihaloacetamide. In fact, where the starting material is a N-monoalkylalkanoylacetamide, it has been found to be virtually impossible to avoid formation of substantial amounts of the 2,2-dihalo-N-alkylalkanoylacetamide. Further, the selective removal of the dihalo compound by physical means was found to be quite difficult and expensive due to the similarity of the physical properties of the dihalo and monohalo compounds.

Processes for improving the selectivity of the halogenation of the above acetamides have been developed, but even in the most effective processes substantial amounts of the dihalo contaminant is formed. Therefore, there is a real need for some method for preparing 2-haloalkylalkanoylacetamides that contain less of the corresponding 2,2-dihaloacetamides than has heretofore been possible without recourse to difficult and expensive physical processes for removing the dihalo contaminants from the corresponding monohalo products.

OBJECTS

It is an object of the invention to provide a selective process for the synthesis of 2-haloalkylalkanoylacetamides. Another object of the invention is to provide a process for the preparation of 2-haloalkylalkanoylacetamides substantially free of contaminating 2,2-dihaloalkylalkanoylacetamides. It is a further object of the invention to afford a process for the synthesis of 2-haloalkylalkanoylacetamides in higher yields than has been possible in known commercial processes. Another object of the invention is to set forth a more economical commercial process for the preparation of 2-haloalkylalkanoylacetamides. Further objects will be apparent from the following detailed description of the invention.

STATEMENT OF THE INVENTION

The objects of the invention are accomplished by subjecting a 2,2-dihaloalkylalkanoylacetamide to the action of a multi-valent transition metal in the presence of strong acids in a solvent inert under the reaction conditions, and separating the 2-haloalkanoylacetamide therefrom.

The reaction is believed to proceed according to the following equations:

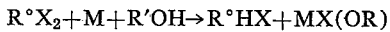

wherein R°X₂ is the dihaloalkylalkanoylacetamide, R°HX is the monohaloalkylalkanoylacetamide, M is a transition metal capable of forming the divalent cation M++, R'OH is the solvent, R' being hydrogen or organic, and X represents halogen.

Further, the reaction takes place at the surface of the multi-valent transition metal. Consequently, the rate of reaction is dependent upon the surface area of the metal that is available for reaction.

PROCESS

In order to facilitate full understanding of the invention, the process of the invention is set forth in more detail in the following description.

The process of the invention comprises reacting a multi-valent transition metal in the presence of a strong acid with a 2,2-dihaloalkylalkanoylacetamide in a suitable solvent, and separating the corresponding 2-haloalkylalkanoylacetamide from the reaction mixture.

The 2,2-dihaloalkylalkanoylacetamides useful in this reaction are of the structural formula

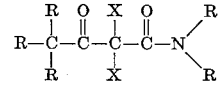

wherein each R is hydrogen or alkyl of 1 to 4 carbon atoms, and each X is a middle halogen, i.e., chlorine or bromine.

The process of the invention appears to be unique to dicarbonylic amides having the structure:

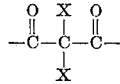

directly connected to the amido nitrogen atom. A particular advantage of the process is that the attack on the first carbon-halogen bond proceeds without appreciable attack either on the second carbon-halogen bond or on any other possible reactive bonds of the molecule, such as those of the adjacent nitrogen atom.

Both the above substituted and unsubstituted dihalo-amides are effectively converted to the corresponding monohalo compounds by the process of the invention. Examples of the dihalo amides having no substituents on the nitrogen atom are:

2,2-dichloroacetoacetamide,
2,2-dibromobutyroacetamide,
4-butyl-2,2-dibromocaproacetamide,
4,4-dibutyl-2,2-dichlorocapryloacetamide,
2,2-dibromovaleroacetamide,
2-chloro-2-bromopropioacetamide,
4-ethyl-4-methyl-2,2-dibromoenanthoacetamide,
4-propyl-4-butyl-2,2-dichlorovaleroacetamide, and the like.

Examples of the starting material where two alkyl groups of 1 to 4 carbon atoms are bonded to the nitrogen include:

2,2-dibromo-N,N-dimethylpropioacetamide,
2,2-dichloro-N,N-dimethylacetoacetamide,
2,2-dibromo-N-methyl-N-ethylvaleroacetamide,
2,2-dichloro-N,N-diethylacetoacetamide,
4,4-dibutyl-2,2-dichloro-N,N-dibutylcapryloacetamide,
4-methyl-4-ethyl-2-chloro-2-bromo-N-butyl-N-methyl-caproacetamide,
4,4-dipropyl-2-2-dichloro-N,N-dipropylenanthoacetamide, and
2,2-dichloro-N,N-diethylisobutyroacetamide.

Further examples will be obvious to one skilled in the art.

The process of the invention is particularly useful for the preparation of 2-halo-N-alkylalkanoylacetamides wherein the N is mono-substituted with alkyl of up to 4 carbon atoms. Examples of these compounds are:

2,2-dichloro-N-methylacetoacetamide,
2,2-dibromo-N-ethylacetoacetamide,
4,4-dipropyl-2,2-dichloro-N-propylvaleroacetamide,
4-ethyl-4-butyl-2,2-dibromo-N-butylcaproacetamide,
4-4-dibutyl-2,2-dichloro-N-butylcapryloacetamide,
2-chloro-2-bromo-N-methylacetoacetamide,
2,2-dichloro-N-isopropyl-sec-butyroacetamide,
2,2-dichloro-N-isobutylenanthoacetamide,
4-ethyl-2,2-dibromo-N-sec-butylacetoacetamide, and the like.

Of this subclass, the most important compounds are 2,2-dichloroacetoacetamides wherein the amide is substituted by one alkyl group of up to 4 carbon atoms. These compounds have the general structural formula:

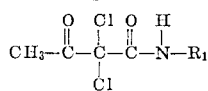

wherein $R_1$ is up to 4 carbon atoms.

The dihalo-amides described above are synthesized by the simple chlorination of the corresponding unhalogenated amides. Many of the latter compounds, for example N-methylacetoacetamide, are available commercially. Those amides not available commercially may be synthesized by methods known to the art. For example, the Whetsone and Stiles patent U.S. 2,802,855, issued Aug. 13, 1957, and the references therein teach a method of synthesis of N-alkyl- and N,N-dialkyl-alkylalkanoylacetamides of over 24 carbon atoms.

The 2,2-dihaloalkylalkanoylacetamide starting material is placed in a solvent which is inert under the reaction conditions and has the following structure,

R—OH wherein R is hydrogen, alkyl of up to 6 carbon atoms or of the structure,

wherein $R_1$ is up to 4 carbon atoms.

The preferred solvent is water although aqueous mixtures of alkanols and alkanemonocarboxylic acids of up to six carbon atoms are equally as useful. Typical members of the alkanols and carboxylic acids include methanol, ethanol, n and isopropyl alcohols, the various isomeric butyl, amyl and hexyl alcohols, acetic acid, propionic acid, butyric acid and the like. In addition, aqueous urea is a suitable solvent in the process of the invention. The urea may be present in concentrations of 0.1 to 0.3 molar based on the moles of water present. The preferable concentration of urea is about 0.2 molar.

Aqueous mixtures of the organic liquids also provide a workable reaction medium and are preferred in particular cases. Choices of the particular solvent or mixtures of solvents will depend to a large extent on solubility relationships, taking into account the particular dihaloalkylalkanoylacetamide to be dehalogenated. The respective amount of solvent or solvents in a mixture should be selected so as to provide optimum solvent capacity for the dihalo-amide to be used.

The solvent in most cases is preferably at least 50 percent water. The additional solvent, if any is used, should be miscible with water to a substantial extend, preferably completely miscible. However, it is permissible and even desirable in some cases to include a substantial amount of an essentially water-immiscible inert liquid such as a chlorinated alkane in the reaction mixture. Examples of such includes methylene chloride, carbon tetrachloride, chloroform and the like. This liquid may be included to effect selective removal of the monohalo product from the reaction mixture.

Since the solvent acts as a hydrogen donor, theoretically enough solvent must be present to supply enough hydrogen to replace the halogen removed from the dihaloalkylalkanoylacetamide. As shown by the above reaction formula this requires at least one equivalent of solvent per mole of dihalo-amide trated, i.e., a total of one mole of water, alkanol, and/or alkane-monocarboxylic acid per mole of the starting material.

It is desirable to provide an excess of solvent as this will not adversely affect the reaction and will insure completion of the reaction. Consequently, at least a twofold, and preferably three or fourfold, or even a larger excess may be employed. The maximum amount is established in most cases only by the diminution of reaction rate that results from high dilution of the reactants.

The reaction medium is preferably acidified to a pH of less than 2 with a strong acid. The reaction may be run at higher pHs, however, any neutralization higher than pH 2 greatly affects the reduction rate and selectivity in the system. The strong acid may be preferably introduced into the reaction in liquid form, either hydrous or anhydrous when feasible. Also, the acid may be introduced in a gaseous form when possible as, for example, in the use of HCl.

For best results, the process of the invention is conducted under acidic conditions, preferably at a pH of less than 2. While less acidic conditions are operable, at higher pHs the reduction rate and selectivity of the process are somewhat reduced. The acidity may be achieved by the introduction into the liquid reaction mixture of appropriate strong acids, either mineral or organic.

Typical mineral acids are hydrochloric acid, hydrobromic acid, sulfuric acid, phosphoric acid, and the like. For example, hydrogen chloride may be employed either as a gas or as an aqueous solution. Alternatively, organic carboxylic, aromatic and sulfonic acids are equally effective. Typical organic acids which may be employed are the fatty acids of preferably up to six carbon atoms, e.g., acetic acid, propionic acid, and hexanoic acid. Other organic acids are the aromatic acids preferably of up to 14 carbon atoms such as benzoic acid, phthalic acid, isophthalic acid, terephthalic acid, diphenyl carboxylic acid, and diphenyl dicarboxylic acid. Still other organic acids are the alkyl sulfonic acids, preferably of up to 12 carbon atoms, exemplified by ethyl sulfonic acid, propyl sulfonic acid, butyl sulfonic acid, and dodecyl sulfonic acid. Also useful in the process of the invention are aryl sulfonic acids of up to 18 carbon atoms. Representative of such acids are benzene sulfonic acid, the toluene sulfonic acids, such as p-toluene sulfonic acid, dodecyl benzene sulfonic acid and naphthyl sulfonic acid.

The dihaloalkylalkanoylacetamide is reacted with a multi-valent transition metal in the reaction medium consisting of the above described solvents and the strong acid. The transition metals useful in this process are capable of forming more than one stable valence state. Therefore, the transition metals which are capable of providing two electrons and forming a valence state of two or three are useful in the process of this invention. These metals are set out in the transition metal group of the atomic table located at the interior of the front cover of the Merck Index, 7th ed. (1960).

Examples of such multi-valent transition metals include copper, iron, nickel, cobalt, cadmium, chromium, vanadium, and manganese. Copper and iron are preferred due to their high selectivity in this process and their commercial availability.

As indicated, above, the reaction is thought to proceed as:

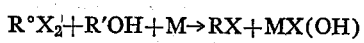

Hence, the process of the invention employs all the reactants in stoichiometric amounts. Consequently, one mole of metal is used per mole of dihaloalkylkanoylacetamide reduced to the monohalo product.

Further, since the reduction reaction takes place at the surface of the metal, the amount of surface area of the metal available for contact with the starting dihaloamide determines the rate of reaction. In order to insure completion of the reaction in a reasonable time, a molar excess of metal should be present in the reaction mixture in a physical form that provides maximum surface area available for contact with the reaction medium. The metal may be added all at once or continuously during the reaction.

The process of the invention is dependent upon contact between the surface of the metal and the reaction medium. As mentioned above, the surface area of the metal available for contact is an important factor of the process of the invention.

Examples of forms of copper metal include copper powder prepared from cupric solutions by addition of zinc dust, 0.039 inch diameter wire cut into ⅛ inch lengths, and 3 inch x ½ inch strips cut from a 1/32 inch copper sheet. Sources of iron include 0.009 inch diameter wire chopped into 1 inch lengths, 3 inch x ½ inch strips cut from ⅛ inch mild steel plate; and a pulverized iron powder available commercially as Connelly, Incorporated Chemical Iron Grade 8000. The latter material is a course, black to brownish powder analyzing by weight 91–93% iron, 3% carbon, 3% silicone, 1–2% manganese, and lesser amounts of chromium, nickel, copper, calcium, magnesium, aluminum, titanium, vanadium, and cobalt in decreasing order of abundance. The remaining multi-valent transition metals within the scope of this process may be used in similar physical forms.

The process of the invention is best carried out at temperatures slightly to moderately above room temperature, for example 30° C. to 100° C., with the temperature range of 35° C. to 85° C. being preferred. The lower temperatures of 35° C. to 55° C. are the most convenient for this purpose. Lower or higher temperatures than the above range are also useful. In some instances, dependent upon the dihalo-amide being used, the reaction may be exothermic. In this case some methods of cooling known to the art should be employed to maintain the desired reaction temperature. In other instances, heat may have to be applied to the reaction mixture. The process can be carried out at atmospheric pressure, or at elevated pressure. Further, the reactants can be added in any desired order, and the process carried out in a batch, semi-batch, or continuous manner.

Therefore, the metal should be present in the physical form that provides a maximum amount of surface area for the reaction.

Agitation of the reaction system will increase the reaction rate and selectivity. This is due to the circulation of the reaction medium past the surface of the metal induced by the agitation. This causes the reduced monohalo-amide to be swept away from the surface of the metal and brings more unreduced dihalo-amide into contact with the metal. Agitation may be induced by a mechanical stirrer or other methods known to the art.

When the conversion of the dihaloalkylalkanoylacetamide to the desired corresponding monohaloalkylalkanoylacetamide product is substantially finished, the product may be separated from the reaction system in any of the conventional methods known to the art, i.e., fractional distillation, solvent extraction, crystallization, and the like.

As the product is organic, it is quite convenient to extract it from the aqueous system with a water-immiscible liquid in which the monohaloalkylalkanoylacetamide is soluble. Such liquids include chloroform, carbon tetrachloride, methylene chloride and the like. Several successive extractions may be used if needed to achieve the desired separation. As mentioned before, such water-immiscible liquids may be included in the reaction mixture so that the manohalo product will be extracted from the aqueous medium as it is formed. Filtration, if necessary, may be used to remove finely divided solids.

The monohalo product corresponds to the dihaloalkyl-alkanoylacetamide starting materials set out previously in every respect except that the product contains one less halogen atom.

The novel and improved features of the process of the invention are illustrated by the following examples.

In the examples, the proportions are expressed in parts by weight unless otherwise noted. As 2,2-dichloro-N-methylacetoacetamide is the preferred starting material of this process, and the corresponding 2-chloroamide is the preferred product, the examples will be described in terms of these two compounds.

EXAMPLE I

The following table sets forth the resultant data from the reduction of 2,2-dichloro-N,N-dimethylacetoacetamide (MMDCAA) to 2 - chloro-N - methylacetoacetamide (MMCAA) with copper metal in a series of reaction runs.

The reduction was carried out in a 500 or 1000 ml. resin kettle equipped with a mechanical agitator mounted above the surface of the copper metal. A reflux condenser served as a vent and a thermometer was attached to the kettle such that it would extend into the reaction solution. Cooling baths were used for temperature control since once started the reductions generally were exothermic. The copper metal was added in a variety of physical forms.

The metal was charged to the reaction flask and then the amide solution to be reduced was added. The reaction mixtures were brought to 80° C., the reaction temperature, held for a predetermined time period, and then extracted 5 times each with a volume of CHCl₃ equal to the volume of the aqueous solution. Filtration was sometimes necessary to remove finely divided solids.

The combined extracts were stripped in a Rinco rotary evaporator to terminal conditions of 80° C. at 3 mm. Hg. The residues were analyzed by gas-liquid chromatography for side products. MMCAA was analyzed by a wet chemical iodometric procedure and MMDCAA by an infrared technique.

The stability of the MMCAA already in solution to be reduced is of major importance. Therefore, yields were calculated as moles MMCAA isolated divided by the sum of moles MMCAA charged plus moles MMDCAA consumed based on chemical and IR analyses.

TABLE I.—REDUCTIONS WITH METALLIC COPPER

[1/1 Cu/MMDCAA Mole Ratio at 80° C.]

| Starting material,* percent wt. | | Form of metal | Time, min. | Product, percent wt. | | Conversion, percent molar, MMDCAA | Yield, percent molar, MMCAA |
|---|---|---|---|---|---|---|---|
| MMCAA | MMDCAA | | | MMCAA | MMDCAA | | |
| 5.5 | 99.5 | Powder | 60 | 83.7 | Nil | 100 | 77 |
| 0.5 | 99.5 | do | 15 | 94.0 | Nil | 100 | 88 |
| 39.4 | 49.4 | Wire | 60 | 77.5 | 3.5 | 94 | 88 |
| 38.4 | 59.8 | do | 60 | 87.4 | 2.0 | 97 | 88 |
| 38.4 | 59.8 | do | 60 | 89.4 | Nil | 97 | 86 |
| 96.1 | Nil | do | 180 | 97.8 | Nil | | 92 |

*Residue analysis.

As shown by Table I using copper as the multi-valent transition metal, selectivity of up to 97.8% and yields of up to 92% of MMCAA were obtained. The last row of data in the table also indicate that the monochloro compound is quite stable in the reaction mixture.

EXAMPLE II

Using the same procedure described in Example I, the reduction was investigated at a reaction temperature of 50° C. at progressing time intervals using copper powder. The resultant data are in Table II.

TABLE II.—REDUCTION WITH METALLIC COPPER

| Reaction time, min. | Isolated product, percent wt. | |
|---|---|---|
| | MMDCAA | MMCAA |
| 0 | 58.2 | 42.1 |
| 2.5 | 52.6 | 43.6 |
| 5 | 41.9 | 55.9 |
| 10 | 3.1 | 91.6 |
| 15 | 1.8 | 92.2 |
| 30 | Nil | 94.2 |
| 60 | Nil | 97.6 |

As shown by Table II, using copper as the multi-valent transition metal and a reaction temperature of 50° C., 97.6% MMCAA in the isolated product was obtained in 60 minutes of reaction time.

EXAMPLE III

Using the same procedure of Example I, the process of the invention was investigated using iron as the multi-valent transition metal. The resultant data are in Table III.

As shown by Table III, the selectivity of the process of the invention using metallic iron is comparable to the selectivity using metallic copper.

EXAMPLE IV

A series of reaction runs were made according to the procedure described in Example I comparing the selectivity and yield of iron, cobalt, nickel and cadmium. The metals were present in a 1.5 gram-atoms ratio of metal/MMDCAA. The data are set forth in Table IV.

The data of Table IV demonstrate that the metals cobalt and nickel give yields and selectivity comparable to iron metal and copper metal in the process of the reaction. The selectivity and yield of cadmium metal appears comparable to that of metallic iron and copper, however the rate of reaction appears slower as only 61% of the MMDCAA was converted to MMCAA in 60 minutes, which was sufficient time for near total conversion by metallic iron and copper.

TABLE IV.—REDUCTION OF MMDCAA WITH METALS

[1.5 gram-atoms metal/mole MMDCAA]

| Metal | Foam | Starting material, percent wt. | | Temp., °C. | Time, min. | Product, percent wt. | | Percent molar conversion MMDCAA | Percent molar yield, MMCAA |
|---|---|---|---|---|---|---|---|---|---|
| | | MMDCAA | MMCAA | | | MMDCAA | MMCAA | | |
| Iron | Wire | 52.4 | 41.2 | 80 | 60 | 5.3 | 84.7 | 92 | 80 |
| Cobalt | Raney catalyst | 52.4 | 41.2 | 50 | 15 | 4.5 | 85.7 | 92 | 97 |
| Nickel | Powder | 52.4 | 41.2 | 50 | 60 | Nil | 90.4 | 100 | 81 |
| Cadmium | Mossy | 52.4 | 41.2 | 50 | 60 | 22.8 | 62.8 | 61 | 83 |

I claim as my invention:

1. A process which comprises reacting in an acidic aqueous solvent a 2,2-dihaloalkylalkanoylacetamide of the formula

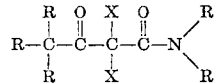

wherein each R is hydrogen or alkyl of 1 to 4 carbon atoms, and each X is chlorine or bromine, with a transition metal selected from the group consisting of copper,

TABLE III.—REDUCTION WITH METALLIC IRON

| Fe/MMDCAA, molar ratio | Starting material, percent wt. | | Temp., °C. | Time, min. | Product, percent wt. | | Percent molar conv., MMDCAA | Percent molar yield, MMCAA |
|---|---|---|---|---|---|---|---|---|
| | MMDCAA | MMCAA | | | MMDCAA | MMCAA | | |
| 1.1/1 | 58.2 | 42.1 | 50 | 60 | 23.1 | 75.3 | 65 | 92 |
| 1.1/1 | 58.2 | 42.1 | 50 | 135 | 12.2 | 84.0 | 82 | 91 |
| 1.1/1 | 58.2 | 42.1 | 20 | 960 | 8.3 | 84.1 | 88 | 86 |
| 1.1/1 | 99 | | 30 | 30 | 10.9 | 84.0 | 91 | 89 |
| 1.5/1 | 99 | | 40 | 45 | Nil | 90.9 | 100 | 72 | iron, cobalt, nickel and cadmium, the amount of said metal being equivalent on a molar basis to the moles of 2,2-dihaloalkylalkanoylacetamide to be dehalogenated.

2. The process of claim 1 wherein R is hydrogen or alkyl of up to 3 carbon atoms.

3. The process of claim 1 wherein R is hydrogen or alkyl of up to 2 carbon atoms.

4. The process of claim 1 wherein the metal is copper.

5. The process of claim 1 wherein the metal is iron.

6. The process of claim 1 wherein the aqueous solvent is a mixture of water and at least one of the compounds selected from the group of
urea,
alkanols of up to six carbon atoms, and
alkanemonocarboxylic acids of up to six carbon atoms.

7. The process of claim 1 wherein the solvent is water.

8. The process of claim 1 wherein the reaction medium is agitated constantly during the reaction.

9. The process of claim 1 wherein the pH of the reaction mixture is less than 2.

References Cited

UNITED STATES PATENTS 3,358,023    12/1967    Birtwistle et al. _____ 260—561

ALEX MAZEL, Primary Examiner

R. V. RUSH, Assistant Examiner